United States Patent [19]

Teranishi et al.

[11] Patent Number: 4,882,580
[45] Date of Patent: Nov. 21, 1989

[54] COMMUNICATION SYSTEM

[75] Inventors: Mitsuji Teranishi, Yao; Yasuo Watanabe; Akira Takeuchi, both of Ibaragi, all of Japan

[73] Assignee: Asics Corporation, Japan

[21] Appl. No.: 731,147

[22] Filed: May 6, 1985

[30] Foreign Application Priority Data

May 9, 1984 [JP] Japan .................................. 59-93668
May 9, 1984 [JP] Japan .................................. 59-93669

[51] Int. Cl.$^4$ ........................... H04Q 5/00; H04Q 5/22
[52] U.S. Cl. ........................... 340/825.51; 340/825.05; 340/825.5; 307/239; 328/154
[58] Field of Search ................ 370/88, 85; 270/825.5; 307/239, 242, 595; 328/152, 154, 109, 116; 364/200

[56] References Cited

U.S. PATENT DOCUMENTS

| 3,634,769 | 1/1972 | Sleater et al. | 328/152 |
| 4,276,643 | 6/1981 | Laprie et al. | 340/825.51 |
| 4,339,808 | 7/1982 | North | 328/154 |
| 4,403,192 | 9/1983 | Willman | 328/152 |
| 4,420,695 | 12/1983 | Fisher | 328/152 |
| 4,423,384 | 12/1983 | De Bock | 328/152 |
| 4,428,046 | 1/1984 | Chari | 364/200 |
| 4,501,021 | 2/1985 | Weiss | 370/88 |

FOREIGN PATENT DOCUMENTS 0093578  4/1983  European Pat. Off. .
58-111433  9/1983  Japan .

OTHER PUBLICATIONS

Using an Optical Highway for Distributed Architecture of Industrial Control Systems, Samuel M. Herb, P. E., pp. 1565-1570 8131 Advances in Instrumentation, vol. 37 (1982) Part 3, Research Triangle Park, N.C., USA.

Primary Examiner—Robert L. Griffin
Assistant Examiner—Ralph E. Smith
Attorney, Agent, or Firm—Lowe, Price, LeBlanc, Becker & Shur

[57] ABSTRACT

A communication system comprising a plurality of devices interconnected into a loop and each provided with two pairs of sending and receiving terminals for transmitting signals in directions different from each other. Each of the devices is connected to the other devices immediately adjacent thereto on the loop by a pair of transmission channels connected to the two pairs of sending and receiving terminals and each including a sending line and a receiving line. Each device comprises a first arrival preference circuit which disciminates whether a first or second input terminal receives a signal first. Also, a control circuit causes the terminal which receives the first arrived signal to accept that signal while the other terminal is inhibited from accepting any signals. A predetermined one of the terminals is controlled to accept an input signal when input signals arrive at the two terminals simultaneously. The device is inhibited, by way of a non-sending signal, from transmitting an output signal when one of the two input terminals is accepting a signal.

7 Claims, 4 Drawing Sheets

COMMUNICATION SYSTEM

BACKGROUND OF THE INVENTION

The present invention relates to a communication system, and more particularly to a system for a plurality of devices to perform communication with one another.

There are various connection systems for conducting serial data transmissions between a plurality of devices, especially between programmable devices incorporating a CPU. These systems have their own merits and demerits. Typical of such connection systems are as follows.

With the star connection system, a plurality of devices are each connected to a central device by a specific transmission line. Although having the advantage that the delay in data transmissions is small, this system has the drawbacks that the transmission line has a large overall length and that the entire system fails when the central device malfunctions.

In the daisy chain connection system, a plurality of devices are connected together in series. This system can be small in the overall length of the transmission line, but if an intermediate device malfunctions or the transmission line is broken at an intermediate portion, there arises the problem that the devices at opposite sides of the faulty device or portion become unable to communicate with each other.

The loop (or link) connection system, which is free of the above problems, has the advantage that there is a line bypassing an intermediate portion of malfunction. However, the system, which is generally unidirectional, still has the problem that the sending terminal and the receiving terminal need to be changed over by a fairly complex control device.

The so-called bus connection system also has the problem that if the bus line is broken at an intermediate portion, blocked communication will result.

With the ring bus connection system, all devices are capable of communicating with one another even if the ring bus line is broken, provided that the failure is limited to a single location.

Nevertheless, the bus connection system, even when in the form of a ring bus connection system, has the fatal drawback that it is not amenable to light communication. Light communication systems have found wide use in recent years because of various advantages. For example, they are operable satisfactorily in the presence of noises electromagnetically induced, and they have large transmission capacities. However, light communication systems can not be replaced by electrical communication systems in a simple fashion, for example, because of the problem of optical branch devices. Although already made available, such devices are presently expensive. With the bus connection system, each of the devices connected together requires an optical branch device. Further because the optical signal transmitted through the bus line is partly divided at the connection between the bus line and each device, the optical signal to be transmitted through the bus line needs to have a considerably great power.

SUMMARY OF THE INVENTION

The main object of the present invention is to provide a communication system which has the feature of the ring bus connection system and which nevertheless is usable also for light communication relatively easily.

The present invention provides a communication system comprising a plurality of devices interconnected into a loop by a transmission line, each of the devices being provided with two pairs of sending and receiving terminals for transmitting signals in directions different from each other, each of the devices being connected to other devices immediately adjacent thereto on the loop by a pair of transmission channels serving as said transmission line and connected to the two pairs of sending and receiving terminals respectively, each of the transmission channels having a sending line and a receiving line. One of the plurality of devices may serve as a central device which takes the initiative in communicating with the other devices, or the different devices may have different orders of preference in communication, or all devices may be given equal rights to communicate. The communication system may be either of the half-duplex type or full-duplex type.

With the communication system of the present invention, each device is provided with two pairs of sending and receiving terminals, and the same data is transmitted via the transmission channels in the form of a loop in two directions at the same time. Accordingly, even if the transmission channel is broken at one portion, all the devices are still in communication with one another. Further when optical fiber is used as the transmission line, opto/electric and electro/optic conversion circuits need only to be used without the necessity of optical branch or dividing devices. Thus, the present system is readily applicable also to light communication. Further because the opto/electric and electro/optic conversion circuits provided for each device serve as optical relay devices, there is no need to consider optical transmission losses even if the optical fiber used is considerably large in the overall length.

When the present system is used for light communication, each device has an electro/optic conversion circuit provided for each sending terminal thereof and an opto/electric conversion circuit provided for each receiving terminal thereof. Preferably, the output side of the opto/electric conversion circuit of each pair is electrically connected to the input side of the electro/optic conversion circuit of the other pair.

When the present system is used for electrical communication, it is also preferable that the output side of each receiving terminal be connected directly or via an amplifier circuit or the like to the sending terminal of the other pair.

The two receiving terminals of each device receive the same signal, so that the device may accept the signal as an incoming signal via only one of the terminals. Most simply, a mere change-over circuit may serve this purpose. Alternatively, earlier one of the two signals of the same kind received by the two terminals may be selected by a preference circuit.

DETAILED DESCRIPTION OF THE INVENTION

The present invention will be described in detail with reference to an embodiment wherein optical fiber is used for communication lines. The full-duplex system is used for the light communication system.

Figure 1:
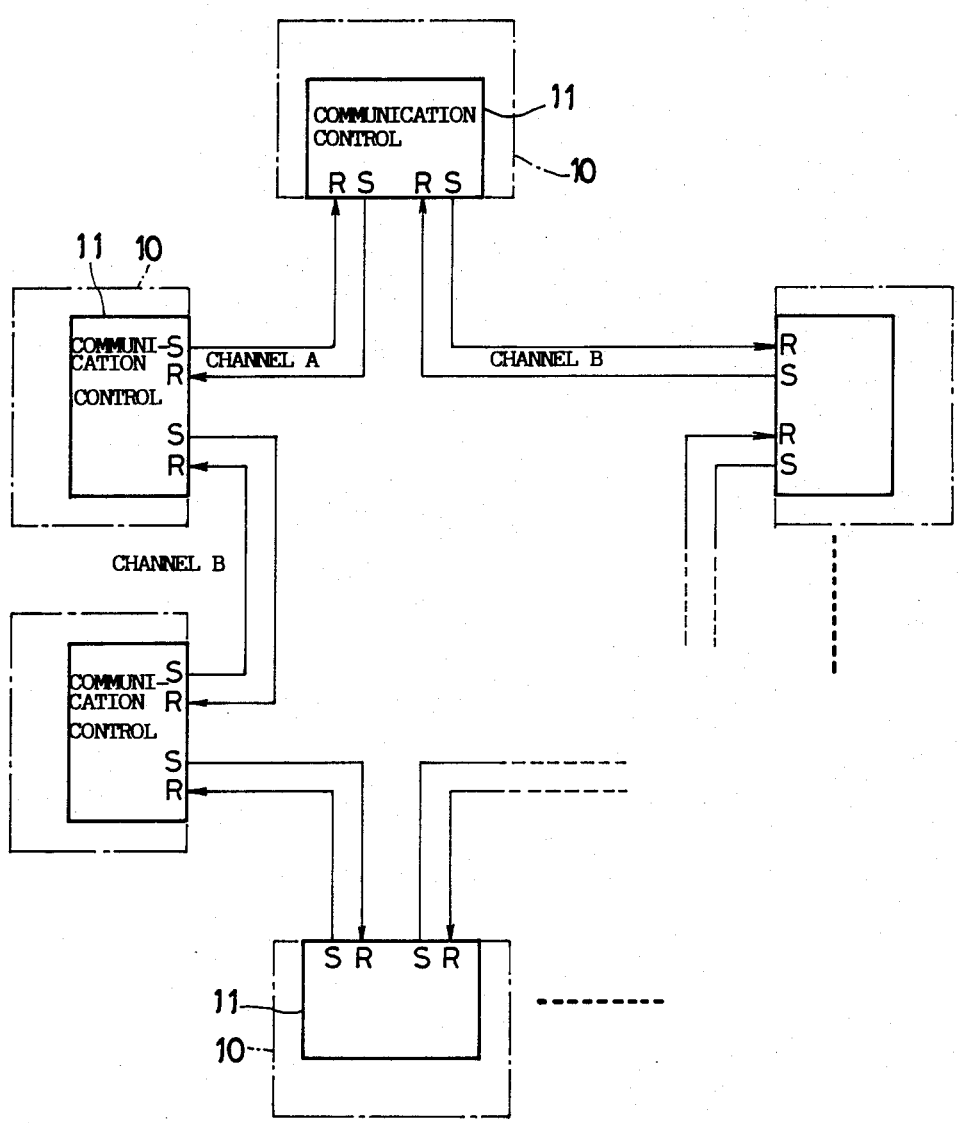
FIG. 1 is a block diagram showing a communication system for a plurality of devices.

With reference to FIG. 1, a plurality of devices 10 are interconnected into a loop by optical communication lines. Each device 10 includes a communication control unit 11 having two pairs of sending and receiving terminals S and R, to which a pair of transmission channels A and B is connected. Each transmission channel A or B has a sending line and a receiving line. Each device 10 on the communication loop is connected to other devices 10 immediately adjacent thereto. One of the plurality of devices 10 may serve as a central device (to be referred to as such for the sake of convenience). In this case, a polling selecting system can be used wherein the central device takes the initiative in communication. Of course, equal communication rights may be given to the devices 10, or a suitable order of preference can be predetermined for these devices to perform communication.

In any case, the same message (data) is transmitted through the transmission channels A and B at all times. Since the same message is thus transmitted through the pair of transmission channels A and B, each device 10 or the central device can communicate with all the other devices 10 even when a failure occurred at one portion of the transmission channel. Further even if one of the communication control units 11 malfunctioned, all the devices 10 other than the one with the faulty unit 11 can normally perform communication with one another or with the central device. Further while devices 10 are communicating with each other or while the central device is communicating with another device, the desired device 10 or the transmission channel can be repaired, or it is possible to remove the desired device 10 from the loop or to incorporate a new device 10 into the loop.

Figure 2:
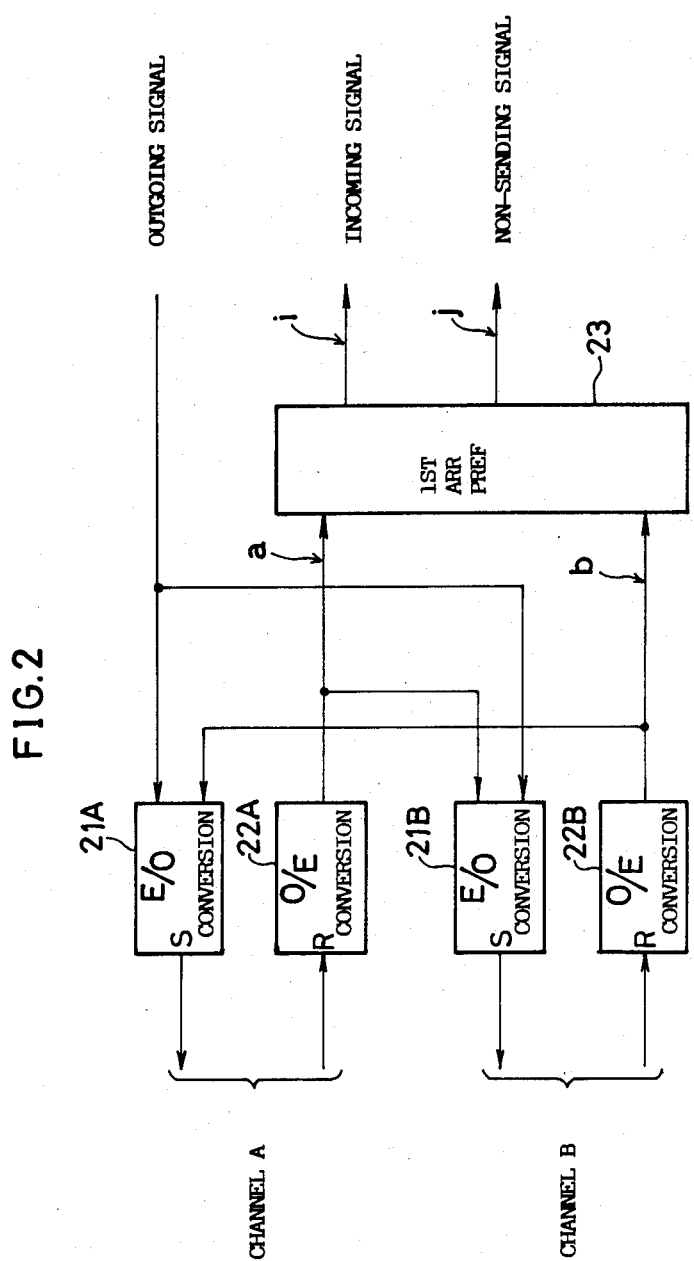
FIG. 2 is a block diagram showing a communication control unit.

FIG. 2 schematically shows the construction of the communication control unit 11. While the same message is transmitted through the pair of transmission channels A and B at all times, there is generally a slight time delay between the time when the message through the channel A arrives at the unit 11 and the time when the message through the channel B reaches the unit, so that the message data is likely to change if the two messages are superposed simply. To avoid this problem, the communication control unit 11 is provided with a first arrival preference (1ST ARR PREF) circuit 23, which will be described in detail later.

The outgoing signal (message) from the CPU or the like of the device 10 is fed to electro/optic (E/0) conversion circuits 21A, 21B, in which the signal is converted to an optical signal, which is then sent out through the sending lines of the channels A, B at the same time.

The optical signal fed to an opto-electric (0/E) conversion circuit 22A is converted to an electric signal, which is sent to the first arrival preference circuit 23 and to the E/0 conversion circuit 21B of the channel B. From the circuit 21B, the signal as converted to an optical signal is sent out through the sending line of channel B. Further when an optical signal is received by an 0/E conversion circuit 22B of the channel B, the signal is converted to an electric signal and sent to the preference circuit 23. The electric signal is also sent to the E/0 conversion circuit 21A, from which it is sent out as converted to an optical signal through the sending line of the channel A. In this way, the signal received from the channel A is immediately sent out through the sending line of the channel B, while the signal received via the channel B is immediately sent out via the sending line of the channel A to realize duplex loop communication. Since the received optical signal is converted to an electric signal, which is sent out via the sending line upon conversion to an optical signal, the 0/E and E/0 conversion circuits serve as intermediate or relay devices, with the result that there is no need to consider the problem of attenuation due to the optical fiber of optical signals even if the loop communication lines have a large overall length. Further even if the preference circuit 23 malfunctioned, the signal received by the O/E conversion circuit is fed to the E/0 conversion circuit and sent out to the sending line. Thus, the communication through the loop will not be interrupted.

When signals are received by the preference circuit 23 via the 0/E conversion circuits 22A, 22B, the circuit 23 determines which of the signals is the first to arrive, whereupon the circuit 23 delivers the earlier signal as the incoming signal i. The delayed signal is prohibited from passing through the circuit 23. While receiving signals, the preference circuit 23 emits a non-sending signal j, which is sent to the CPU of the device 10. Thus, while receiving this signal j, the CPU stops transmission of outgoing signals. This is due to the following reason. The outgoing signal is fed to the E/0 conversion circuits 21A, 21B as stated above, so that when there is an incoming signal from the 0/E conversion circuits 22A, 22B to the circuits 21A, 21B, the outgoing signal would be superposed on the incoming signal. It will become apparent later than when signals are fed to the 0/E conversion circuits 22A, 22B at the same time, the signal through the channel A is given preference.

Figure 3:
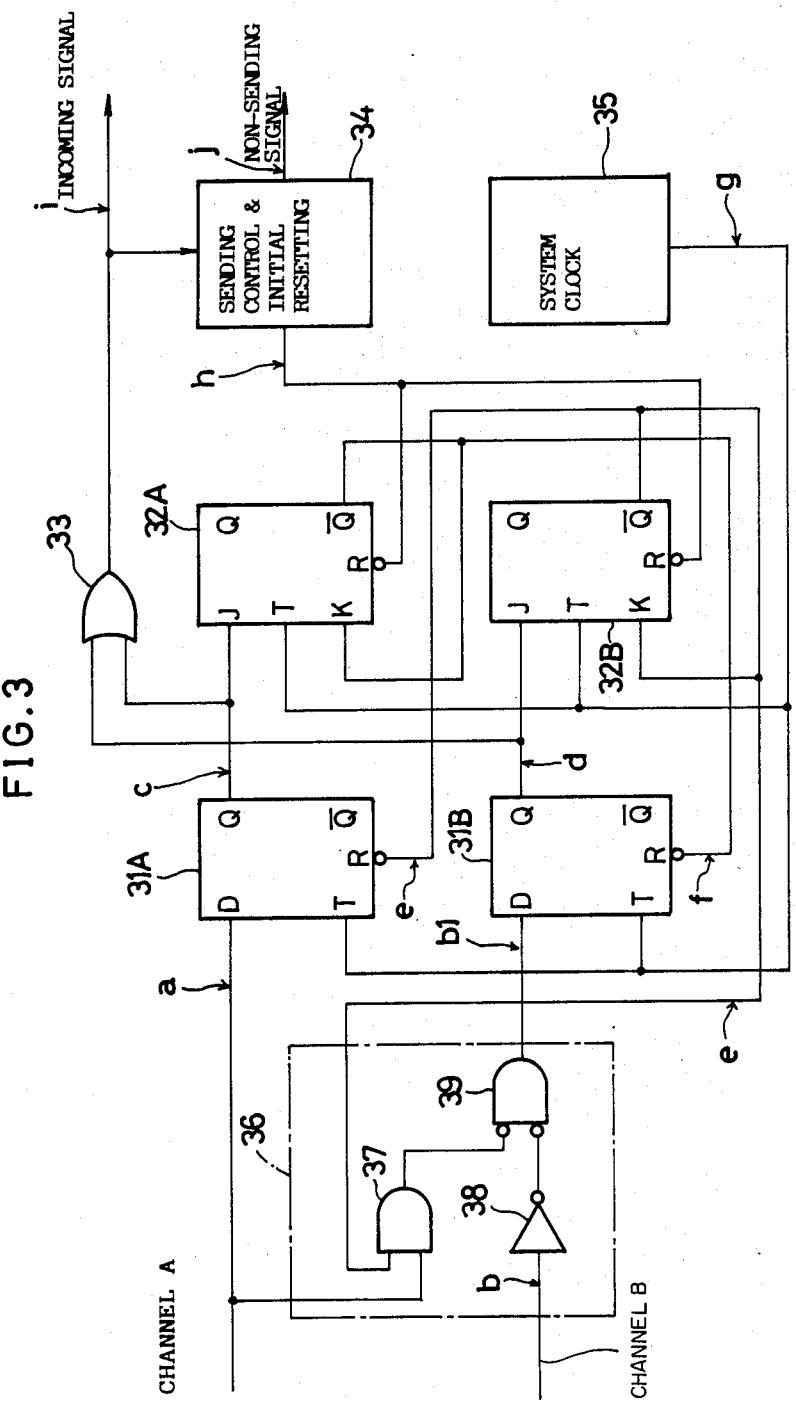
FIG. 3 is a block diagram showing a first arrival preference circuit.
Figure 4C:
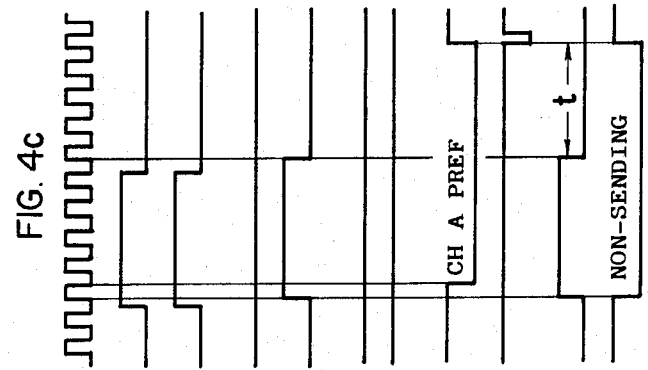
FIGS. 4(I) to 4(III) a time charts showing the operation of the preference circuit.
Figure 4B:
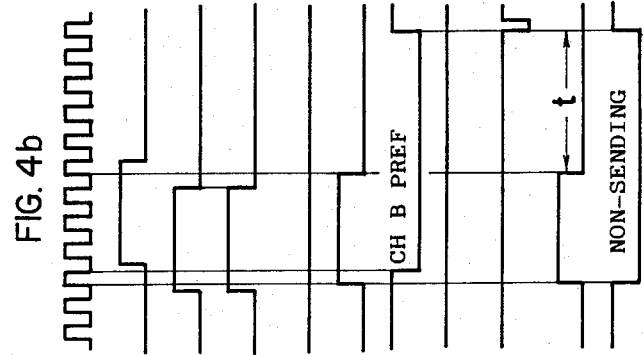
Figure 4A:
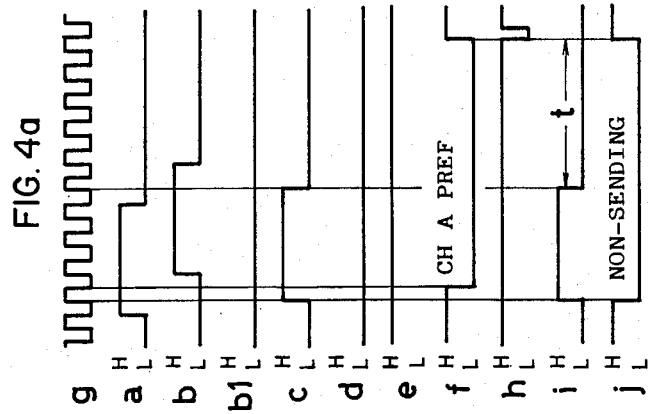

FIG. 3 shows the first arrival preference circuit 23 in detail, and FIG. 4 shows the operation thereof. With reference to FIG. 3, the output signal a of the 0/E conversion circuit 22A on the channel A is fed to a data input terminal D of a D flip-flop (gate circuit) 31A and also to a first arrival discrimination circuit 36. The output signal of the 0/E conversion circuit 22B on the channel B is fed via the circuit 36 to a D flip-flop (gate circuit) 31B as a signal b1. The output signals (non-inverted signals) c and d from these D flip-flops 31A, 31B are applied to an OR circuit 33, affording an incoming signal i. As will be described later, the output signals c and d are not produced at the same time. When the input of the signal b is earlier than that of the signal a by at least one period of clock pulse g, the first arrival discrimination circuit 36 permits passage of the signal b but otherwise forbids the passage of the signal b.

The D flip-flops 31A, 31B are controlled by JK flip-flops (gate control circuits) 32B, 32A. The output signals c, d of the D flip-flops 31A, 31B are fed also to input terminals J of the JK flip-flops 32A, 32B, respectively. An inverted output $\bar{Q}$ from the JK flip-flop 32A is sent to a forced reset terminal R of the D flip-flop 31B, and an inverted output $\bar{Q}$ from the JK flip-flop 32B to a forced reset terminal R of the D flip-flop 31A. Usually these D flip-flops 31A, 31B are in condition to pass the input signals a and b1 respectively in timed relation to the clock pulse g given to clock input terminals T. However, when the JK flip-flop 32A is set by the input signal c, the inverted output $\overline{Q}$ is at L level, forcibly resetting the D flip-flop 31B to forbid the passage of the input signal b1. Conversely, if the JK flip-flop 32B is set by the input signal b1, the inverted output $\overline{Q}$ thereof, which is at L level, forcibly resets the D flip-flop 31A to forbid passage of the input a.

A sending control and initial resetting circuit 34 has two functions. The circuit 34, receiving the input signal i, counts a specified period of time t upon discontinuance of input of the incoming signal i. Upon lapse of the time t without receiving the signal i, the circuit 34 produces an initial resetting pulse h at L level, whereby the JK flip-flops 32A, 32B are forcibly reset. Further after the receipt of the incoming signal i until the lapse of the specified period of time t, the circuit 34 produces a non-sending signal j at L level. A system clock pulse generator circuit 35 produces a series of clock pulses g, which are fed to the clock input terminals T of the D flip-flops 31A, 31B and the JK flipflops 32A, 32B.

In FIG. 4, the period of clock pulses g is shown as considerably enlarged. The signals a, b, b1, c, d and i, although actually inverted repeatedly according to the data which the signal represents, are shown all at H level. FIG. 4 (I) shows the case wherein the signal a via the channel A has arrived earlier than the signal b via the channel B. FIG. 4 (II) shows the case wherein the signal b has arrived earlier than the signal a, and FIG. 4 (III) shows the case in which the two signals a and b arrived at the same time.

The output signal e of the inverted output terminal $\overline{Q}$ of the JK flip-flop 32B is fed to one input terminal of an AND circuit 37 included in the first arrival discrimination circuit 36, while the signal a is fed to the other input terminal of the AND circuit 37. The output of the AND circuit 37 is led to one input terminal of NAND circuit 39, to the other input terminal of which is fed the signal b from the channel B as inverted by a NOT circuit 38. With the JK flip-flop 32B reset in the initial state, the signal e is at H level. Accordingly, in response to the signal a (H level) received, the AND circuit 37 produces an output at H level, which is given to one input terminal of the NAND circuit 39, with the result that the NAND circuit 39 closes its gate to forbid passage of the signal b. Thus, when the signal a arrives at the same time as, or earlier than, the signal b, the signal b is unable to pass through the first arrival discrimination circuit 36 (FIGS. 4 (I) and (III), especially FIG. 4 (III)).

When the signal a is fed to the D flip-flop 31A, the signal a passes through the D flip-flop 31A (as signal c) and further through the OR circuit 33 with the rise of the clock pulse g, giving an incoming signal i. The signal c is also fed to the input terminal J of the JK flip-flop 32A. With the fall of the clock pulse g, the JK flip-flop 32A is set, producing an inverted output $\overline{Q}$ at L level. Since the L level signal is fed back to an input terminal K of the JK flip-flop 32A, the JK flip-flop 32A remains in set state.

The L level signal f from the inverted output terminal $\overline{Q}$ of the JK flip-flop 32A is given to the forced resetting terminal R of the D flip-flop 31B to forcibly reset the D flip-flop 31B. Consequently, the output d from the non-inverted output terminal Q of the D flip-flop 31B is held at L level, and the JK flip-flop 32B is held also in reset state. While the input of signal a is present, the gate of the NAND circuit 39 remains closed. Because the signal f is held at L level until the JK flip-flop 32A is initially reset by the initial resetting circuit 34, the D flip-flop 31B will not be set even if the signal a is discontinued, opening the gate of the NAND circuit 39 and permitting the signal b to pass through the circuit 39 (as signal b1). The signal f is a channel A preference (CH A PREF) signal for preventing the signal b1 via the channel B from passing through the D flip-flop 31B (see FIGS. 4 (I) and (III)).

When the signal b has arrived at the first arrival discrimination circuit 36 before the signal a, the input signal a of the AND circuit 37 is at L level even if the other input signal e is at H level, so that the output of the AND circuit 37 is at L level, permitting the NAND circuit 39 to pass the signal b therethrough. The signal b is inverted by the NOT circuit 38 and further inverted by the NAND circuit 39, with the result that the output signal b1 from the NAND circuit 39 is of the same form as the signal b. The signal b1 fed to the data input terminal D of the D flip-flop 31B passes through the flip-flop 31B with the rise of clock pulse g, giving a signal d, which passes through the OR circuit 33 to become an incoming signal i. The signal d is fed also to the input terminal J of the JK flip-flop 32B, setting this flip-flop 32B upon the fall of clock pulse g. The inverted output terminal $\overline{Q}$ of the JK flip-flop 32B feeds out an output e at L level, which is fed to the forced resetting terminal R of the D flip-flop 31A. Consequently, the D flip-flop 31A remains reset even if a signal a is given, preventing passage of the input signal a through the D flipflop 31A. The signal e is a channel B preference (CH B PREF) signal (see FIG. 4 (II)).

When the JK flip-flop 32B is set with the signal e changed to L level, the output of the AND circuit 37 remains at L level irrespective of the presence or absence of the signal a. Consequently the gate of the NAND circuit 39 remains open, permitting passage of the input signal b through the NAND circuit 39.

The signal b may arrive slightly earlier than the signal a, but if a clock pulse g does not rise and fall during this time difference, the gate of the NAND circuit 39 is closed by the signal a before the channel B preference signal (L level) e is fed out. The signal a from the channel A therefore proceeds in preference.

We claim:

1. A first arrival preference circuit, provided in an apparatus having a processing device for receiving input signals and transmitting an output signal to other apparatus, said first arrival preference circuit comprising:

two gate circuits connected respectively to each of two input terminals for receiving first and second input signals;

a first arrival discrimination circuit for discriminating which one of the first and second input signals has arrived first to one or the other of said two input terminals and for determining that the first and second input signals have arrived to the two input terminals at the same time;

a gate control circuit for causing the gate circuit connected to the input terminal where the first signal has arrived or to a predetermined one of said terminals when the two input signals have arrived at the same time to accept the input signal, and for causing the other gate circuit to be inhibited from accepting the input signal, and a sending control circuit for producing a non-sending signal while one of the first and second input signals is being accepted, the non-sending signal controlling said processing device to inhibit transmission of said output signal to said other apparatus.

2. A communication system comprising a plurality of devices interconnected into a loop by a transmission line, each of the devices being provided with two pairs of sending and receiving terminals for transmitting signals in directions different to the other devices immediately adjacent thereto on the loop by a pair of transmission channels serving as said transmission line and connected to the two pairs of sending and receiving terminals respectively, each of the transmission channels having a sending line and receiving line, wherein each of the devices is provided with a preference circuit comprising:

a first arrival discrimination circuit having three input terminals and a signal output terminal providing a signal responsive to signals at said three input terminals wherein said first and second input terminals are connected respectively, to said two receiving terminals;

a first flip-flop having an input connected to a first of said two receiving terminals;

a second flip-flop having an input coupled to said signal output terminals of said arrival discrimination circuit;

an OR circuit coupled to outputs of said first and second flip-flops; and third and fourth flip-flops having inputs connected, respectively, to outputs of said first and second flip-flops, an inverting output of said third flip-flop resetting said second flip-flop and an inverting of said fourth flip-flop resetting and first flip-flop and connected to said third input terminal of said first arrival discrimination circuit;

an output of said OR gate providing an output signal from said first arrival preference circuit.

3. A communication system as defined in claim 2 wherein said first arrival discrimination circuit comprises:

a first AND gate having one input connected to said first and a third arrival discrimination circuit input terminal;

an inverter having an input connected to said second arrival discrimination circuit input terminal;

a second AND gate having a first inverting input connected to an output of said first AND gate and having a second inverting input connected to an output of said inverter and having an output connected to said output terminal of said first arrival discrimination circuit.

4. A communication system comprising a plurality of processing devices, each said processing device receiving first and second input signals and transmitting an output signal to said devices interconnected into a loop by a transmission line, each of said devices being provided with two pairs of sending and receiving terminals for transmitting said output signals in different directions to other ones of said devices immediately adjacent thereto on the loop by a pair of transmission channels serving as said transmission line and connected to the two pairs of sending and receiving terminals, respectively, each of the transmission channels having a sending line and a receiving line wherein each said processing device is provided with a preference circuit, said first arrival preference circuit comprising:

two gate circuits connected, respectively, to each of two input terminals for receiving first and second input signals;

a first arrival discrimination circuit for discriminating which one or the other of the first and second input signals has arrived first to the two input terminals and for determining that the first and second input signals have arrived to the two input terminals at the same time;

a gate control circuit for causing the gate circuit connected to the input terminal where the first signal has arrived or to a predetermined one of said terminals when the two input signals have arrived at the same time, to accept the input signal, and for causing the other gate circuit to be inhibited from accepting the input signal; and a sending control circuit for producing a non-sending signal while one of the first and second input signals is being accepted, the non-sending signal controlling said processing device to inhibit transmission of said output signal to said other devices.

5. A communication system as defined in claim 4 wherein the sending and receiving lines are optical fibers, and each of the devices has an electro/optic conversion circuit provided for each sending terminal thereof and an opto/electric conversion circuit provided for each receiving terminal thereof, the output side of the opto/electric conversion circuit of each pair being electrically connected to the input side of the electro-optic conversion circuit of the other pair.

6. A first arrival preference circuit as defined in claim 4 wherein said first arrival discrimination circuit comprises:

said first AND gate having one input connected to said first and a third arrival discrimination circuit input terminal;

an inverter having an input connected to said second arrival discrimination circuit input terminal;

a second AND gate having a first inverting input connected to an output of said first AND gate and having a second inverting input connected to an output of said inverter and having an output connected to said output terminal of said first arrival discrimination circuit.

7. A first arrival preference circuit comprising:

a first arrival discrimination circuit having three input terminals and a signal output terminal providing a signal responsive to signals at said three input terminals wherein first and second ones of said input terminals are connected, respectively, to two receiving terminals;

a first flip-flop having an input connected to a first of said two receiving terminals;

a second flip-flop having an input coupled to said signal output terminal of said first arrival discrimination circuit;

an OR circuit coupled to outputs of said first and second flip-flops; and third and fourth flip-flops having inputs connected, respectively, to outputs of said first and second flip-flops, an inverting output of said third flip-flop resetting said second flip-flop and an inverting output of said fourth flip-flop resetting said first flip-flop and connected to said third input terminal of said first arrival discrimination circuit;

an output of said OR gate providing an output signal from said first arrival preference circuit.

* * * * *